United States Patent
Nanu et al.

(10) Patent No.: US 10,740,633 B2
(45) Date of Patent: Aug. 11, 2020

(54) HUMAN MONITORING SYSTEM INCORPORATING CALIBRATION METHODOLOGY

(71) Applicant: FotoNation Limited, Galway (IE)

(72) Inventors: Florin Nanu, Bucharest (RO); Stefan Petrescu, Bucharest (RO); Florin Oprea, Bucharest (RO); Emanuela Haller, Bucharest (RO)

(73) Assignee: FotoNation Limited, Galway (IE)

( * ) Notice: Subject to any disclaimer, the term of this patent is extended or adjusted under 35 U.S.C. 154(b) by 18 days.

(21) Appl. No.: 16/150,225

(22) Filed: Oct. 2, 2018

(65) Prior Publication Data
US 2019/0102638 A1 Apr. 4, 2019

Related U.S. Application Data

(60) Provisional application No. 62/590,769, filed on Nov. 27, 2017, provisional application No. 62/566,687, filed on Oct. 2, 2017.

(51) Int. Cl.
| | |
|---|---|
| *H04N 17/00* | (2006.01) |
| *G06K 9/00* | (2006.01) |
| *G06T 7/50* | (2017.01) |
| *G06K 9/62* | (2006.01) |
| *G06T 7/70* | (2017.01) |
| *H04N 5/225* | (2006.01) |

(52) U.S. Cl.
CPC ....... *G06K 9/00845* (2013.01); *G06K 9/0061* (2013.01); *G06K 9/00597* (2013.01); *G06K 9/6298* (2013.01); *G06T 7/50* (2017.01); *G06T 7/70* (2017.01); *G06T 2207/10016* (2013.01); *G06T 2207/10048* (2013.01); *G06T 2207/30201* (2013.01); *G06T 2207/30268* (2013.01); *H04N 5/2256* (2013.01)

(58) Field of Classification Search
CPC .......... G06K 9/00597; G06T 7/50; G06T 7/70
USPC ..................... 348/78, 77, 148, 136
See application file for complete search history.

(56) References Cited

U.S. PATENT DOCUMENTS

| | | | |
|---|---|---|---|
| 8,891,824 B2 * | 11/2014 | Wu .............. | A61B 5/1103 382/103 |
| 2016/0367127 A1 * | 12/2016 | Wulf .............. | A61B 3/0025 |

* cited by examiner

*Primary Examiner* — Jefferey F Harold
*Assistant Examiner* — Jean W Desir
(74) *Attorney, Agent, or Firm* — Lee & Hayes, PC

(57) ABSTRACT

Method for monitoring eyelid opening values. In one embodiment video image data is acquired with a camera which data are representative of a person engaged in an activity, where the activity may be driving a vehicle, operating industrial equipment, or performing a monitoring or control function. When the person's head undergoes a change in yaw angle, such that eyelids of both eyes of the person are captured with the camera, but one eye is closer to the camera than the other eye, a weighting factor is applied, which factor varies as a function of the yaw angle such that a value representative of eyelid opening data based on both eyes is calculated.

20 Claims, 4 Drawing Sheets

Driver Monitoring System Operation

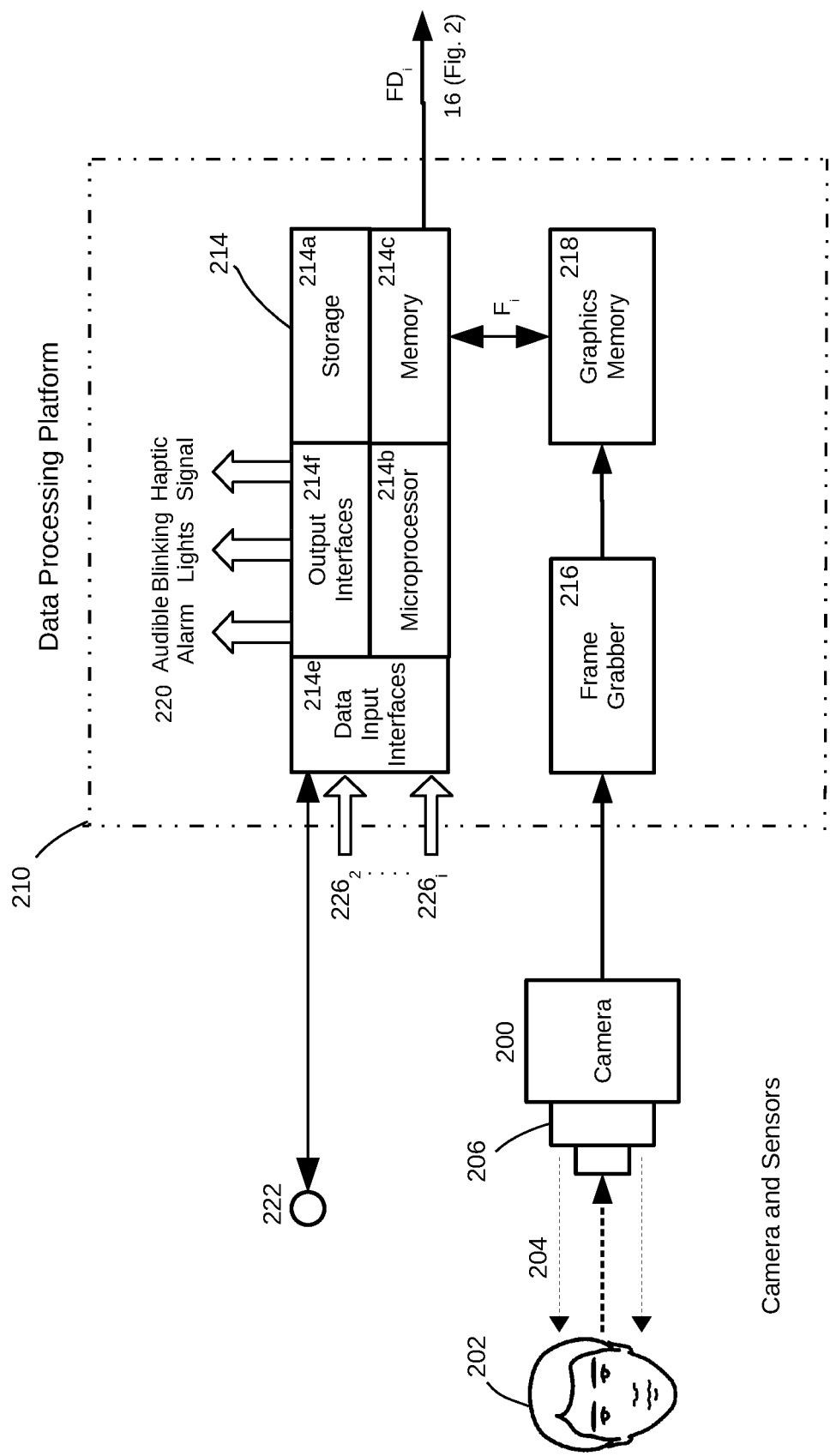

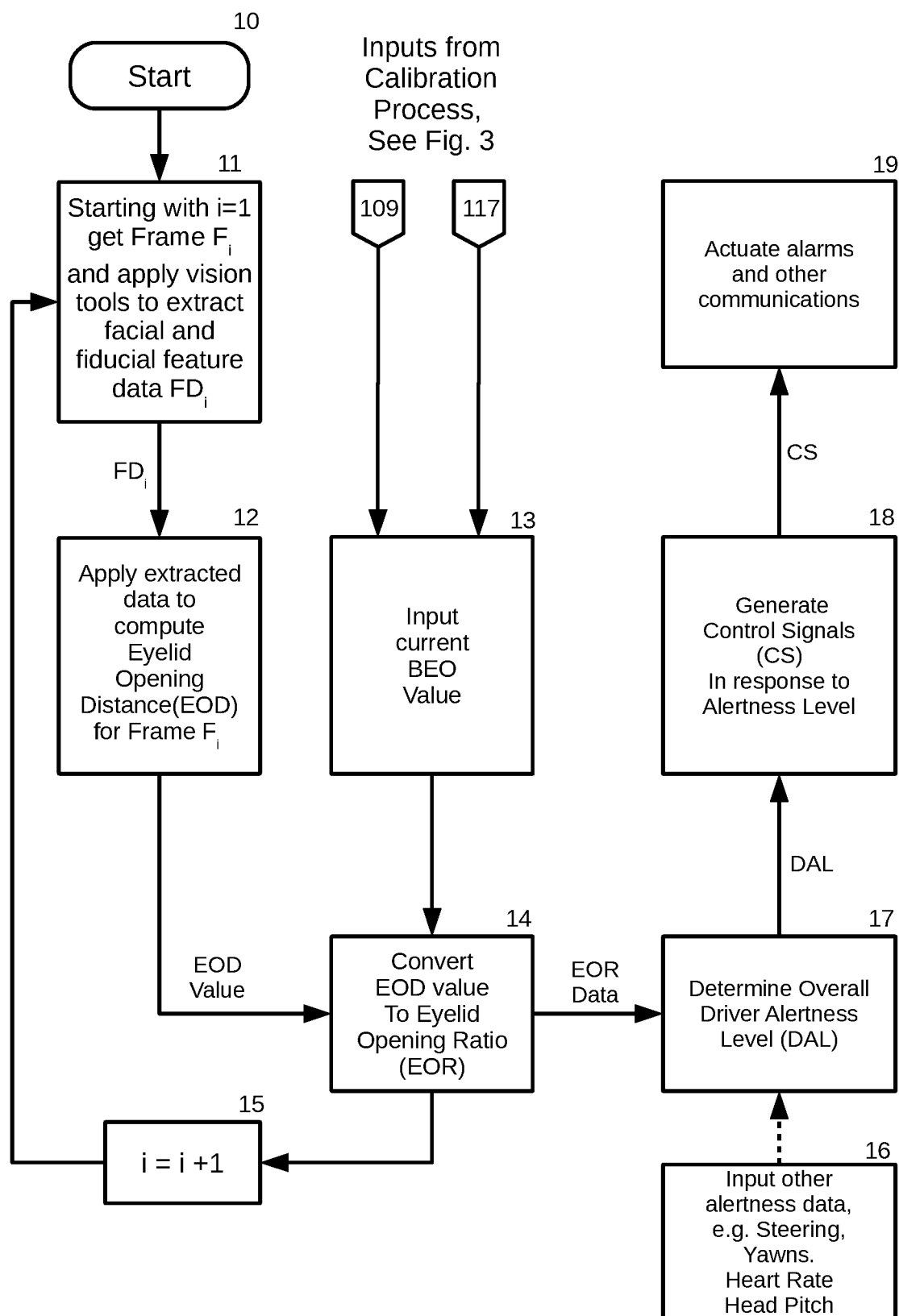
Fig. 2, Driver Monitoring System Operation

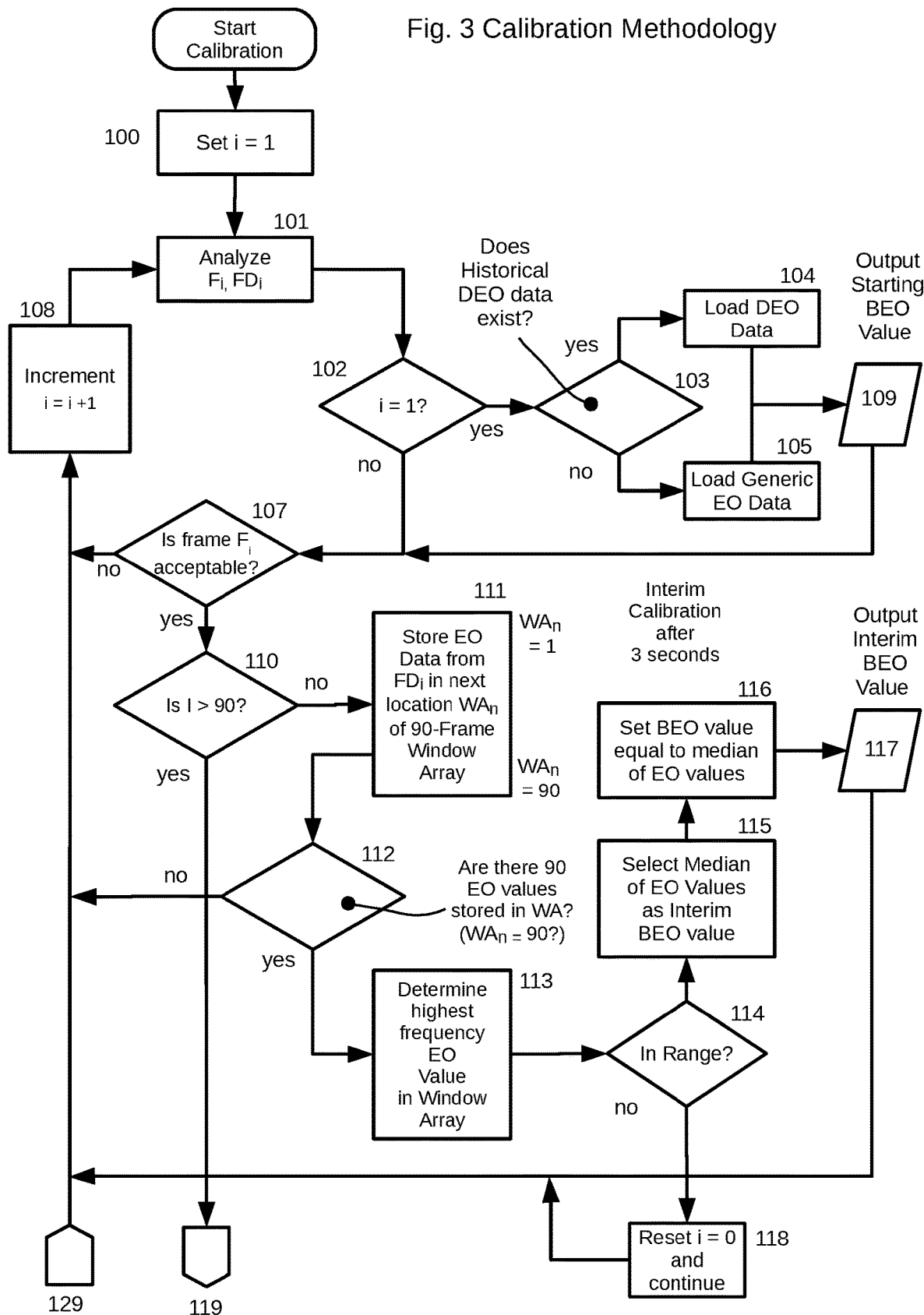
Fig. 3 Calibration Methodology

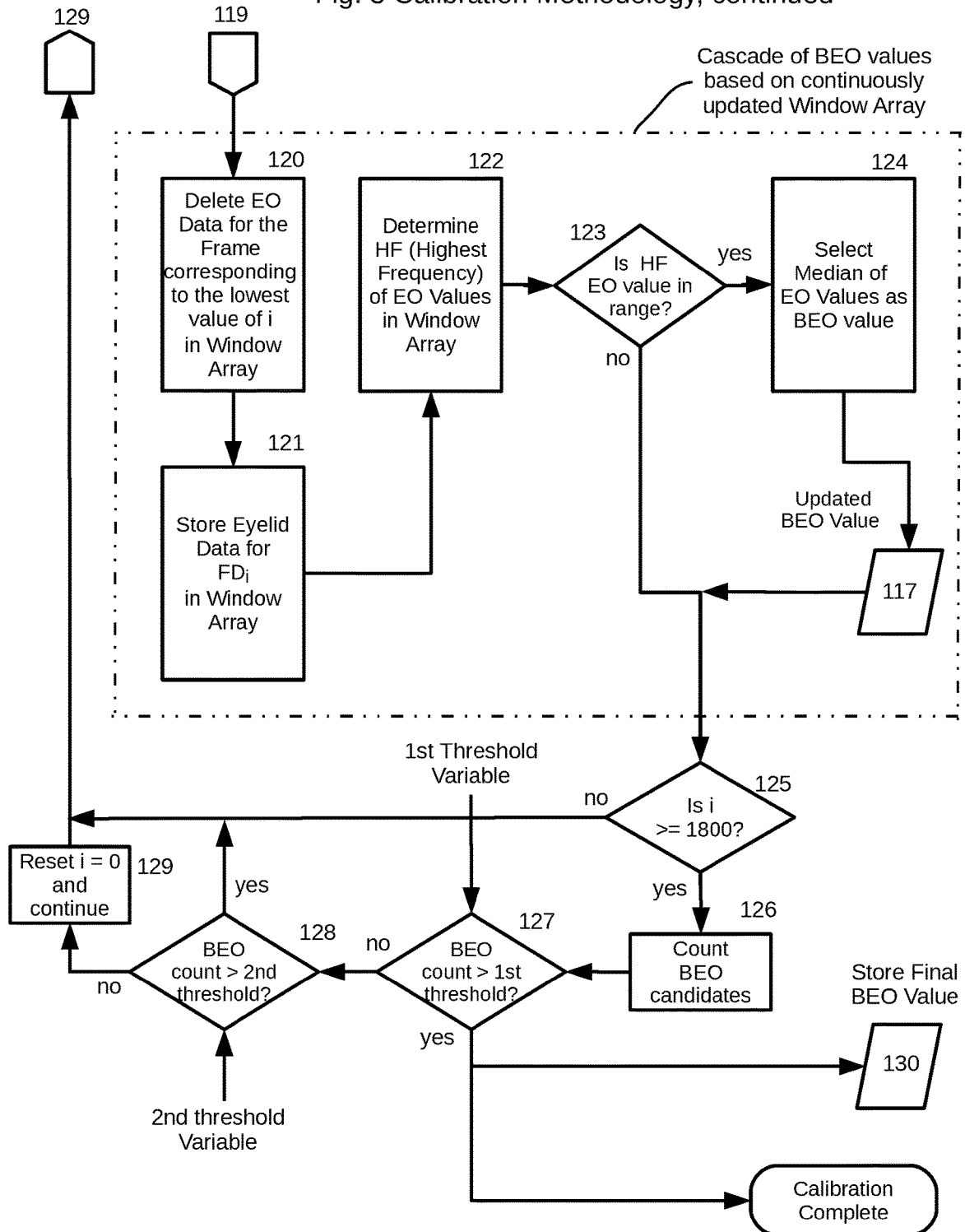

HUMAN MONITORING SYSTEM INCORPORATING CALIBRATION METHODOLOGY

RELATED APPLICATIONS

This application claims priority to U.S. Provisional Patent Application Ser. No. 62/566,687, "Eyelid Opening Percentage Algorithm", filed 2 Oct. 2017 and claims priority to U.S. Provisional Patent Application Ser. No. 62/590,769, "Eyelid Opening Percentage Algorithm", filed 27 Nov. 2017, and for which the disclosure of each is now incorporated herein by reference. This application is related to U.S. patent application Ser. No. 15/621,848, filed 13 Jun. 2017, "Facial Features Tracker With Advanced Training for Natural Rendering of Human Faces in Real-Time", and is related to U.S. patent application Ser. No. 15/912,946, filed 6 Mar. 2018, "A method for generating a set of annotated images", the disclosures of which are each hereby incorporated herein by reference.

TECHNICAL FIELD OF THE INVENTION

The present invention relates to systems which monitor human activities for safety or alertness and, more particularly, to systems which include calibrated measurement of eyelid openings. In one series of embodiments, systems and methods apply to monitoring alertness of a vehicle driver.

BACKGROUND

Automated driver monitoring systems assess status and changes in a variety of parameters relating to driver performance and attentiveness. They can monitor face angles, i.e., the pitch angle to determine whether the head of a sleepy driver is facing downward, and yaw rotation to determine if a driver's head is turned too far away from the direction of travel. With driver monitoring systems coupled to vehicle instrumentation the system can warn a driver, or passengers or persons remote from the vehicle, when a potentially dangerous situation is sensed. The systems can determine and respond to when the driver may not be paying attention to roadway situations. In some instances, when a potential danger is identified, if the system reaches a determination of driver inattention, automatic controls may prevail over the driver to, for example, decelerate vehicle speed before a danger level escalates.

With driver inattention known to be a significant factor in roadway accidents and deaths, monitoring and addressing occurrences of inattentive driving (e.g., due to drowsiness, medical emergencies or distractions) can mitigate a major cause of vehicle crashes. In addition to improvement of human safety, the ability to accurately monitor and rapidly address inattention can prevent accidents that lead to environmental disasters resulting from multiple modes of transportation.

A common and important indicator of human drowsiness is based on measurement of eye lid openings. While this is particularly relevant to transportation safety, it is also of interest in monitoring a wide variety of human activity affected by drowsiness, including learning. Vision systems incorporating image processing technology temporally monitor eyelid closure to assess drowsiness levels. When a system detects that a driver has become inattentive, it can perform several warning operations, including generation of audible messages and sounds to gain driver attention. Yet the effectiveness and accuracy of measurement may be compromised to the point of not detecting drowsiness in a timely manner or by generating false determinations resulting, for example, from visual occlusions or inaccuracies introduced in the optical measurement process. Given enough time, a system can be calibrated with a high degree of accuracy.

SUMMARY OF THE INVENTION

According to a series of embodiments a method is provided for monitoring eyelid opening values by acquiring video image data with a camera. The data are representative of a person engaged in an activity, where the activity may be driving a vehicle, operating industrial equipment, or performing a monitoring or control function. When the person's head undergoes a change in yaw angle, such that eyelids of both eyes of the person are captured with the camera, but one eye is closer to the camera than the other eye. A weighting factor, which varies as a function of the yaw angle, is applied such that a value representative of eyelid opening data based on both eyes is calculated as:

$$w(\text{LEOD}) + (1-w)(\text{REOD})$$

where LEOD is the measured left eyelid opening distance and REOD is the measured right eyelid opening distance; and where the weight, w, varies from zero to one and changes proportionally to the change in head yaw angle. The weight, w, may vary from zero to one and change proportionally to the change in head yaw angle between a preselected range of angles $[-\phi, +\phi)]$. The preselected range may extend between $\phi=-15°$ to $\phi=+15°$. The preselected range extends between $\phi=-15°$ to $\phi=+15°$. In one example embodiment $w=(0.5)(\theta+30)/30$, where $\theta$ is the yaw angle. In another embodiment, when the person is looking straight ahead the yaw angle $\theta=0°$; with w ranging between zero and one, when $\phi=30°$, and with the head turned to a yaw angle of 24 degrees to the driver's right, so that the right eye is barely visible to the lens: the LEOD is assigned a weight factor of 0.9, and the REOD is assigned a weight factor of 0.1. The BEO value may corrected when the head of the driver undergoes a change in pitch angle.

BRIEF DESCRIPTION OF THE FIGURES

The following drawings are provided to facilitate understanding of the inventive concepts described in the written description which follows, where:

FIG. 1 illustrates a processing system according to the invention;

FIG. 2 illustrates overall operation of a Driver Monitoring System that acquires driver alertness data and assesses driver drowsiness; and FIG. 3 illustrates details of a methodology which provides BEO calibration values.

Like reference numbers are used throughout the figures to denote like components. Where components are illustrated schematically, it is to be understood that various details, connections and components of an apparent nature are not shown in order to emphasize features of the invention. Various features shown in the figures are not to drawn scale.

DETAILED DESCRIPTION OF EMBODIMENTS OF THE INVENTION

Assessment of drowsiness is dependent on an ability to accurately observe relative changes in eyelid openings for the subject being monitored. Automated vision systems measure eyelid opening distances in image pixels or mm.

The relationship between pixels and mm may be based on an assumed interpupillary distance between pupils, e.g., 68 mm. Features of the invention are in recognition that, for assessments of drowsiness, eyelid openings are best measured in normalized units relative to a baseline distance between eyelids. Due to high levels of variation in eyelid opening distances among differing population groups, embodiments of the invention enable transformation of eyelid opening values from distance units to normalized units, e.g., percentages relative to a baseline eyelid opening value.

Eyelid opening distance information is not readily converted to normalized units. Computing the relative degree that eyelids are open requires collection and processing of accurate data, i.e., with distance calibrations specific to the subject. Referred to herein as an eye-opening ratio, or eyelid opening percentage, the degree to which a pair of eyelids are open or closed can be normalized. The normalization can be had by establishing a statistically based eyelid dimension for the subject. Then the eye-opening ratio can be calculated by dividing the eyelid opening distance information, acquired during drowsiness monitoring, by the statistically based eyelid dimension (referred to as a baseline eyelid opening value). The BEO value is acquired at the beginning of a driving excursion, when the driver is assumed to not be drowsy.

The baseline eyelid opening value need not be a maximum eyelid opening or be based on an arithmetic average. When the chosen baseline distance is less than the maximum in the range of measurable distances between eyelids, the values of eyelid openings measured during an assessment of drowsiness may exceed 100 percent.

The baseline eyelid opening value is established with data acquired from the driver being monitored. This enables monitoring of drowsiness as a percent of eyelid openness. This can render greater consistency between data samples of the same driver. Normalization can allow application of the same criteria for assessing drowsiness among multiple drivers generally, i.e., rendering it less important to separately calibrate a drowsiness assessment algorithm for each driver in a population.

Notwithstanding differing characteristics from driver to driver, the same calibration procedures for determining the baseline distance can be used for all drivers so that all drowsiness data is normalized and similar drowsiness criteria can be applied to different drivers. That is, normalization can render an algorithm for assessment of drowsiness more applicable among persons having different sized eyelid openings so that drowsiness assessments may be performed with the same criteria.

In situ eyelid opening calibration is necessary to account for differences between different drivers of the same vehicle as well as changing environmental factors. However each time such a monitoring system is put into use, the requisite calibration process creates downtime during which vehicle safety is potentially at risk. One option is to simply use previously acquired calibration data for a particular driver, but this may incorrectly apply data assumed to remain accurate and applicable for the specific driver when numerous passive parameters may change, e.g., brightness levels, lighting uniformity, eyewear glare, etc. Still, it is believed historical calibration data can provide a useful role during the time period required to perform measurement calibration procedures which address unique characteristics of the person being monitored. Nonetheless, due to potential errors which could result from use of previously acquired data, systems which assess drowsiness must expedite collection of accurate eyelid opening data by only imparting minimal delays for data acquisition and processing to perform necessary calibration.

Driver monitoring systems must also operate accurately as soon as possible each time an individual operates a vehicle for the first time. Use of generic data, i.e., data not specific to the current driver, may, at times, be the only alternative to acquiring calibration data. Ideally, it is desirable to reduce the runtime of calibration operations from minutes to seconds.

To the extent accuracy is adversely affected, a system which assesses drowsiness based on eyelid opening criteria should take into consideration individualized traits specific to the person being monitored. Among differing population groups there can be wide variability in the sizes of eyelid openings, rendering it difficult to establish baseline data without acquiring dimensional information specific to the subject. Machine vision data must also be analyzed to account for lens artifacts and noise, including glare and interference due to light reflection. These parameters may vary based on, for example, differing styles of driver eye wear.

According to embodiments of the invention, a methodology is provided which enables a driver monitoring system to simultaneously (i) acquire and analyze eyelid opening information derived from image data to calibrate the system based on information specific to the driver and an associated environment, and (ii) acquire and apply data from multiple sources to monitor eyelid opening measures to assess drowsiness. The algorithm may apply driver historical data or generic data, e.g., when historical data is not available for the current driver.

Outputs of the system are calibration values, these being used, for example, to provide a baseline eyelid opening (BEO) calibration value. During system operation, an eyelid opening measured in mm can be consistently and meaningfully converted to an eyelid opening percentage, taken as a ratio of the measured eyelid opening value to the calculated BEO calibration value. The BEO calibration value may be statistically based.

In addition to deriving data from image frames for calculating BEO calibration values, the methodology acquires data for multiple parameters and applies criteria to determine whether, based on the parameters, individual image frames are suitable for use when performing the eyelid opening calibration.

In one example application, car specific parameters are initially acquired. These may include camera position and car driving status (e.g., parked, temporarily stopped, operating at a low or a high speed, operating in reverse). Shortly after system power up, driver identification is performed. If the driver is identified and historical eyelid opening data are available, this data may be loaded to provide a temporary (default) BEO calibration value. In other embodiments, historical eyelid opening data may be loaded to provide a long term BEO calibration value.

When historical data is being considered for use as a long term BEO calibration value in lieu of acquiring new calibration data, multiple data sets may be available (e.g., from multiple driving excursions made by the same person on different days), in which case a median filter may be applied as a criterion to select a most realistic or representative temporary calibration value. The result may then be applied to provide a long term BEO calibration value.

When no historical data is available for the identified person, generic (statistical) data representative of the eyelid opening value (e.g. 11 mm) may be initially used as the temporary (default) BEO calibration value, e.g., during a relatively short initial period while acquiring new calibration data to provide a more representative baseline eyelid opening calibration value (first interim measure) as described herein.

Following input of a temporary BEO calibration value the methodology is initiated to perform calibration processes for an initial period of time to compute a first baseline eyelid opening value, also referred to as a first interim measure. During this second stage of the methodology, as well as a subsequent third stage, in which additional baseline eyelid opening values are acquired, data is collected and analyzed from multiple sources (e.g., the driver monitoring system, various sensors, and core vision libraries) to gather relevant eyelid opening data for determining a BEO calibration value for, preferably, each of the driver's eyes. Each input is tested to determine if minimum acceptable conditions are met. For the second stage, if sufficient acceptable data is captured, e.g., derived from acquisition of 90 image frames in approximately three consecutive seconds, the calibration process is completed, i.e., with computation of a first baseline eyelid opening value to provide normalized eyelid opening values (as a percentage) for data collected to assess drowsiness. In the third stage of the methodology, additional baseline eyelid opening values are sequentially computed to further provide normalized eyelid opening values (as a percentage) for the collected drowsiness data.

For one illustrated embodiment, initially at least the second stage of the methodology performs operations on data extracted from up to 90 or more image frames. Later stages will vary but may carry forward approaches similar to the second stage. At a typical frame rate of about 30 fps, the operations performed on 90 image frames last about 3 seconds. For image data in individual frames, the methodology applies criteria to the state of each of multiple frame validation parameters (e.g., eyelid opening, head yaw angle, head pitch angle) to identify frames from which image data should not be used in the calculation of the first BEO value. By way of an example embodiment, data may be excluded and not used if derived from an image frame for which: the driver's face cannot be detected; no eyes are found; the face is overexposed; sunlight creates a strong contrast between parts of the face; strong shadows are present on part of the face; the driver is wearing sunglasses; and head pitch or head yaw exceed predetermined angles. With the foregoing criteria applied to each frame of image data, it is determined which of the 90 frames are to be used to compute the first baseline eyelid opening value.

In both the second and third stages a set of criteria are also applied to evaluate levels of active parameter activities, including eye blinks, head motion, and variations in ambient lighting conditions along the face. Based on the foregoing exemplary applications of criteria, it is determined whether satisfactory conditions are present to proceed with the acquired data to compute the first baseline eyelid opening value. If the conditions are not found to be satisfactory, one or more signal filtering processes can be applied (e.g., to remove eye blinks which might have skewed the data). After application of the filtering processes it is again determined whether the conditions are satisfactory in order to proceed with the acquired data and compute the first baseline eyelid opening value. If, after removal of blinks, the conditions are still not satisfactory (e.g., there is too much noise or filtering is not possible), the calibration process is repeated (i.e., all data may be cleared with the time or frame counter reset) one or more times, until it is determined that satisfactory conditions are present in order to compute the first BEO value. Once the conditions are met, the eyelid opening data is processed to provide a BEO value. Following computation of this statistic, a cascade of second measures or BEO values of eyelid opening values may be computed as additional frame data is acquired. The additional baseline eyelid opening values may be based on some or all of the data acquired from the first 90 frames of image data. With each of the second measures based on such additional data, the second measures can provide more representative values of the baseline eyelid opening value used for computation of the normalized eyelid opening data, expressed as a ratio or percentage, collected when the system is monitoring driver drowsiness. Even though historical data may initially be applied as a temporary (default) BEO calibration value, or even as a long term BEO calibration value in lieu of acquiring new calibration data, the values based on the historical data may be supplanted by the updated values of the baseline eyelid opening values once generation of the cascade of second measures of eyelid opening values begins. There is an option of replacing the historical data with more temporally representative values of the baseline eyelid opening value used for computation of the normalized eyelid opening data.

With the methodology computing baseline eyelid opening values, with data derived from multiple image frames, analysis measures may be applied to identify the presence, among groups of image frames (e.g., temporally based sequences of 90 data frames) of skewed data. When subject to statistically based criteria, such groups of image frames can be classified as unsuitable for generating measures representative of eyelid opening values and are not used to generate baseline eyelid opening values.

For example, given a window of 90 image frames, the frequency of occurrence of eyelid opening values may be measured in predefined mm increments (bins) extending, perhaps, from zero mm to more than 14 mm. A histogram analysis can determine, for the set of 90 data frames, the highest frequency of occurrence of eyelid opening values within a particular bin in the overall range of eyelid opening values. If the highest frequency of occurrence lies in the margins of the distribution, this may indicate that a baseline eyelid opening value generated from the group of data frames is not representative of eyelid opening values. With such an occurrence this particular window of 90 image frames may be unsuitable for use when calculating a normalized eyelid opening from data collected when the system is monitoring driver drowsiness. according to the invention, statistically based criteria are used to determine whether data derived from this particular window of frame data are unsuitable for computing baseline eyelid opening values. When the window is found unsuitable, none of the data derived from the window are used to compute a baseline eyelid opening value.

As one example, if the result of the histogram analysis is that the highest frequency of occurrence of eyelid opening values occurs between 0 and 1 mm, or between 1 mm and 2 mm, this may be due to excessive blinking, or squinting in the presence of continued glare. The data derived from the window may be filtered to remove the data associated with blinking and the window could be reassessed for suitability of calculating a normalized eyelid opening from collected driver drowsiness data. However, the illustrated embodiment discards the entire window of data frames and processes the next window of data frames.

The window rejection criteria can be implemented by defining bounds for an acceptable range of eyelid opening values, such as 2 mm to 12 mm. This range may be used with criteria to totally exclude use of windows of data for which significant portions of data may be associated with blink cycles or eye squints. In a first approach, when it is determined that a threshold percentage of the histogram data (i.e., a histogram of values which are the highest frequency of occurrence of eyelid opening values) falls outside (above or below) the range of 2 mm to 12 mm (e.g., 70 percent), data derived from the window are not used to compute a baseline eyelid opening value. In a second approach, when it is determined that a threshold percentage (e.g., 40 percent) of the histogram data falls below the 2 mm cut-off, data derived from the window are not used to compute a baseline eyelid opening value. Similarly, when it is determined that a threshold percentage (e.g., 40 percent) of the histogram data exceeds the 12 mm cut-off, none of the data derived from the window are used to compute a baseline eyelid opening value.

The methodology may be implemented by statistically analyzing the histogram eyelid opening data and computing an "out of range" percentage for the last 90 data frames collected. If the percentage of "out of range" data exceeds the threshold criterion, then the system does not calculate a baseline eyelid opening value from data in the frame window and begins analyzing data derived from a subsequent frame window. If the percentage of "out of range" data does not exceed the threshold criterion, then the methodology calculates another baseline eyelid opening value from data derived from the subject frame window.

The quality of video monitoring within a vehicle cabin is subject to numerous limitations and influences. These limit the ability to acquire image data of optimal quality for both calibration and monitoring of eyelid opening values needed to accurately assess driver drowsiness. Head rotations, for example, can affect the ability to accurately measure eyelid distances. When a camera is positioned at a known angle in front of and below the head of a driver (e.g., along the instrument panel near the steering wheel), the actual distance between eyelids can be based on the acquired image data when the angle of the head relative to the camera lens is known. It may be assumed this angle is fixed based on known driver positioning. On the other hand, when the head of the driver undergoes a change in pitch angle (as when a sleepy drive looks downward), the change in eyelid opening distance may require calculation based on tracking the pitch angle. When the head of the driver undergoes a change in yaw angle, one eye may be farther from the camera lens than the other eye.

A Representative Value (RV) is calculated to provide the overall eyelid opening percentage of the driver. Embodiments of the invention adjust or limit measurements of eyelid opening percentage to account for the significance of the driver's head being raised or lowered (pitch rotation) and turned to the left or right (yaw rotation). The variability due to yaw rotation is addressed by taking a weighted average of the eyelid opening percentage of each eye as a function of yaw rotation angle.

RV is computed based on the opening percentage of each eye as a weighted average. If only one eye is visible, the representative value will be the distance between eyelids of the one visible eye. However, if two eyes are visible in the image, a weighting function is introduced to factor in the effects of yaw rotations of the driver's head. With a yaw angle of 0° corresponding to when the driver's head is facing the direction straight ahead of the vehicle, and with the camera lens symmetrically centered about the driver's eyes, the captured image frames are only assumed acceptable for use in the calibration methodology when the range of changes in the head yaw angle, θ, is limited to values ranging between +φ and −φ relative to the lens center position. In one embodiment, the range is limited to excursions of +30° and −30°.

The Representative Value, RV, varies as a function of the yaw angle based on a weighted sum of the measured Left Eyelid Opening Distance (LEOD) and the measured Right Eyelid Opening Distance (REOD) where the weighting factor, w, is based on a variable head yaw angle θ such that $$RV = w(LEOD) + (1-w)(REOD)$$

where the weight, w, changes proportionally to the change in head yaw angle between [−φ, +φ] in degrees:

$$w = (0.5)(\theta + 30)/30$$

With w ranging between zero and one, when φ=30°, and the head is turned 24 degrees to the driver's right (so that the right eye is barely visible to the lens), the LEOD is assigned a weight factor of 0.9, and the REOD is assigned a weight factor of 0.1.

An example of an analyzed input signal which falls under optimal conditions is when both the left and right eyes are visible to the camera lens; both eyes are open; the head pitch is no more than 10° with respect to a typical reference position (e.g., with respect to a vertical or with respect to the optical axis of the lens); the excursion, φ, in the yaw angle is no more than 15°. The calibration process of 3 consecutive seconds is required to finish after a preset period (e.g., 60 seconds) after face detection occurs.

In advantageous embodiment of the invention, the figures illustrate a Driver Monitoring System 1 for a motor vehicle (not shown). Given that it is desirable to generate useful data with driver monitoring systems as quickly as possible, and the time required to obtain calibrated data to normalize eyelid opening measurements can delay operation of the driver monitoring system, the embodiment illustrated in FIGS. 1 through 3 employs a multi-stage methodology that can immediately deploy the driver monitoring system and also expedite provision of BEO values.

A video system includes a camera 200 which captures images of the driver 202 with illumination 204 provided by a near infra red (NIR) source configured as a light ring 206. The camera may also acquire images with visible light. A data processing platform 210 includes a processing block 214, a frame grabber 216 and graphics memory 218. The processing block 214 comprises storage 214a, microprocessor 214b, memory 214c, a plurality of data input interfaces 214e to microprocessor 214b and a plurality data output interfaces 214f from microprocessor 210b. Storage 214 holds vision tools for extraction of facial feature and fiducial data from image frames generated by the camera 200.

A temperature sensor 222, positioned to monitor the environment in the driver compartment, sends temperature data to the microprocessor 214b as input 226$_i$ to the data input interface 214e. A plurality of other data input interfaces 214e receive (e.g., steering wheel movement data, frequency of driver yawns, driver heart rate, changes in head pitch) as other data inputs 226$_2$-226$_i$.

When the driver 202 is seated and powers the vehicle, his face is automatically illuminated with (NIR) light 204 from the light ring 206 and the camera 200 begins relaying frames F$_i$ of image data to the data processing platform 210 where frame grabber 216 formats the image frames F$_i$ which then transfers the formatted frames to graphics memory 218.

FIG. 2 illustrates overall operation of the Driver Monitoring System, including acquisition of driver alertness data and assessment of driver drowsiness. FIG. 3 illustrates details of a methodology which provides BEO calibration values. The image frames $F_i$ are sent to memory 214c. The microprocessor 214b applies the vision tools to frames $F_i$ to extract frame data $FD_i$ (which includes facial feature and fiducial data) from the image frames $F_i$. Step 11. The data processing platform applies extracted data to compute an Eyelid Opening Distance (EOD) value for each frame $F_i$. Step 12. Referring to Step 13, a calibrated Baseline Eyelid Opening (BEO) value (Output 109 or 117, FIG. 3) is provided with the EOD value to convert the EOD value to an Eyelid Opening Ratio (EOR). Step 14.

An overall driver alertness level is synthesized based on the EOR data of Step 14 and input of other alertness data (Step 16), e.g., steering wheel movement data, frequency of driver yawns, driver heart rate, changes in head pitch). The disparate data may be weighted to synthesize a composite Driver Alertness Level (DAL) in Step 17. Based on the synthesized Driver Alertness Level, the system 1 generates control signals in response. Step 18. The control signals are used to actuate alarms and communications. Step 19.

FIG. 3 illustrates details of a methodology which provides BEO calibration values as inputs at Step 13 in the Driver Monitoring System Operation. With the counter initialized to i=1 (Step 100), both the raw data of Frame $F_1$ and extracted image frame data $FD_1$ of Step 11 (FIG. 2) are acquired for analysis. Step 101. In one embodiment with i=1 (Step 102), the image data $FD_1$ is analyzed to determine whether the driver can be recognized, e.g., by comparing the image data derived from Frame $F_i$ to information in a driver database in storage 214a. If the driver is recognized and historical Driver Eyelid Opening (DEO) data for the identified driver exists in the driver database (Step 103), e.g., from previous calibrations, the previously stored DEO data is selected (Step 104) as an output 109 to be used as a calibrated starting BEO value for input to Step 13 (FIG. 2). Otherwise, Generic Eyelid Opening (EO) data 114 is acquired from storage 214a (Step 105) and is output as a starting value (Step 109) for input to Step 13.

Step 107 examines the raw data of each frame $F_i$ to determine whether the image is acceptable. For example, an image with no face, no eyes, unequal lighting or motion blur it would be disqualified from Eyelid Aperture calibration. If the frame data is not acceptable (Step 107), then the count i is incremented (Step 108) and both the raw data of the next image Frame $F_2$ and the extracted image frame data $FD_2$ of Step 11 (FIG. 2) are analyzed. Step 101. The process of continuing to determine whether acquired frames are acceptable continues until 90 Eyelid Opening values are deemed acceptable to form a window array.

Each time an image frame $F_i$ is deemed acceptable, (Step 110) with i not greater than 90, EO data in the extracted frame data $FD_i$ acquired in Step 11 is sequentially stored in a next location $WA_n$ of the 90 frame window array, as determined by the value of an index n, where n ranges from 1 to 90. Step 111. Once it is determined that 90 EO values are stored in the window array (Step 112), a histogram-like analysis is performed to determine the highest frequency EO value in the window array. Step 113. If the highest frequency EO value is outside the predetermined range of EO values (Step 114), the window array is cleared of all EO values $WA_n$ and the calibration method is continued with i reset to 0 (Step 118) and I is incremented at Step 108.

If the highest frequency EO value in the window array is within a predetermined range of EO values (Step 114) an Interim BEO value is assigned the median value of the stored EO data (Step 115). The median of the EO values is chosen and output as an Interim BEO value. Step 116 and 117. The Interim BEO value is output (Step 117) to provide the current BEO value input to Step 13 in FIG. 2.

Next, i is again incremented (Step 108) and both the raw data of Frame $F_1$ and the extracted image frame data $FD_1$ of Step 11 (FIG. 2) are acquired for analysis. Step 101. With i not equal to 1 (Step 102) Step 107 examines the raw data of frame $F_i$ to determine whether the image is acceptable. If the frame data is not acceptable (Step 107), then the process continues through Steps 108, 101, 102 and 107 with the count i being incremented. If the frame data is found acceptable (Step 107), and i is determined to be greater than 90 in Step 110, the process continues with Steps 120 and 121 where EO data in the window array location $WA_n$ corresponding to the lowest value of i is deleted (i.e., the deleted data corresponds to the frame data $FD_i$ having the lowest value of i); and EO data for FDi having the current value of i is stored in the window array.

Next, with a histogram-like analysis the highest frequency EO value in the current window array is identified (Step 122) and it is determined whether that EO value is within a predefined range (Step 123). If the highest frequency EO value in the window array is within the predetermined range of EO values, the median of the EO values in the current window array is selected as an updated BEO value (Step 117). The process continues to generate a cascade of updated BEO values, as i is incremented and the window array is updated in Steps 120 and 121. When i reaches 1,800 (Step 125) it is determined whether the total number of BEO values generated exceeds a first threshold minimum, e.g., 500 BEO candidate values (Steps 126 and 127), in which case the last generated BEO value is stored as a Final BEO value as historical DEO data in storage 210a. When the total number of candidate BEO values generated exceeds a second threshold minimum less than the first threshold minimum, a choice may be made between restarting calibration and iterating the value of i. See Steps 128 and 129. In Step 129 the calibration method is continued with the window array cleared of all EO values $WA_n$ and i is reset to 0.

Embodiments of a methodology have been described which enable improvements in driver monitoring systems that assess driver inattention generally. The invention is also applicable to a wide variety of human activities where the functional abilities of the person are assessed for possible impairment, especially temporary loss of attentiveness. Advantageously the methodology incorporates calibration procedures which can substantially improve the accuracy of assessments in levels of attention. Further, techniques are described which reduce the requisite calibration time while simultaneously permitting collection of data for the alertness assessments.

Example embodiments of the invention have been illustrated but the invention is not so limited. Accordingly, the scope of the disclosure is only limited by the claims which follow with each claim constituting a separate embodiment. Embodiments may combine different claims. Combinations of different embodiments are within the scope of the claims and will be apparent to those of ordinary skill in the art after reviewing this disclosure.

The claimed invention is:

1. A method for monitoring eyelid opening values by acquiring video image data with a camera which data are representative of a person engaged in an activity, where the activity may be driving a vehicle, operating industrial equipment, or performing a monitoring or control function, comprising:

detecting that the person's head undergoes a change in yaw angle, such that eyelids of both eyes of the person are captured with the camera, but one eye is closer to the camera than the other eye, and applying a weighting factor which varies as a function of the yaw angle such that a value representative of eyelid opening data based on both eyes is calculated as: w(LEOD)+(1−w)(REOD), where:

LEOD is the measured left eyelid opening distance and REOD is the measured right eyelid opening distance; and where the weight, w, varies from zero to one and changes proportionally to the change in head yaw angle.

2. The method of claim 1 where the weight, w, varies from zero to one and changes proportionally to the change in head yaw angle between a preselected range of angles $[-\phi, +\phi]$.

3. The method of claim 2 where the preselected range extends between $\phi=-15°$ to $\phi=15°$.

4. The method of claim 2 where the preselected range extends between $\phi=-30°$ to $\phi=30°$.

5. The method of claim 2 where $w=(0.5)(\theta+30)/30$ where $\theta$ is the yaw angle.

6. The method of claim 2 where
when the person is looking straight ahead the yaw angle $\theta=0°$;
with w ranging between zero and one, when $\phi=30°$, and the head turned a yaw angle of 24 degrees to the driver's right, so that the right eye is barely visible to the lens: the LEOD is assigned a weight factor of 0.9, and the REOD is assigned a weight factor of 0.1.

7. The method of claim 1 where a baseline eyelid opening (BEO) value is corrected when the head of the driver undergoes a change in pitch angle.

8. A system comprising a data processing block configured to perform operations to monitor eyelid opening values by acquiring video image data with a camera, wherein the video image data are representative of a person engaged in an activity, the operations comprising:

detecting that the person's head undergoes a change in yaw angle, such that eyelids of both eyes of the person are captured with the camera, but one eye is closer to the camera than the other eye, and applying a weighting factor which varies as a function of the yaw angle such that a value representative of eyelid opening data based on both eyes is calculated as: w(LEOD)+(1−w)(REOD), where:

LEOD is the measured left eyelid opening distance and REOD is the measured right eyelid opening distance; and where the weight, w, varies from zero to one and changes proportionally to the change in head yaw angle.

9. The system of claim 8 where the weight, w, varies from zero to one and changes proportionally to the change in head yaw angle between a preselected range of angles $[-\phi, +\phi]$.

10. The system of claim 9 where the preselected range extends between $\phi=-15°$ to $\phi=15°$.

11. The system of claim 9 where the preselected range extends between $\phi=-30°$ to $\phi=30°$.

12. The system of claim 9 where $w=(0.5)(\theta+30)/30$ where $\theta$ is the yaw angle.

13. The system of claim 9 where
when the person is looking straight ahead the yaw angle $\theta=0°$;
with w ranging between zero and one, when $\phi=30°$, and the head turned a yaw angle of 24 degrees to the driver's right, so that the right eye is barely visible to the lens: the LEOD is assigned a weight factor of 0.9, and the REOD is assigned a weight factor of 0.1.

14. The system of claim 8 where a baseline eyelid opening (BEO) value is corrected when the head of the driver undergoes a change in pitch angle.

15. The system of claim 8, further comprising
a frame grabber configured to format image frames received from the camera and to provide the image frames to the data processing block.

16. The system of claim 15, further comprising:
the camera.

17. The system of claim 16, further comprising:
a near-infrared light (NIR) source configured to illuminate the person's face.

18. The system of claim 17, further comprising:
the camera.

19. The system of claim 8, further comprising:
a graphics memory; and
a frame grabber configured to format image frames received from the camera and to provide the image frames to the data processing block via the graphics memory.

20. The system of claim 19, further comprising:
a near-infrared light (NIR) source configured to illuminate the person's face.

* * * * *